(12) United States Patent
Ekonen et al.

(10) Patent No.: US 10,029,564 B2
(45) Date of Patent: Jul. 24, 2018

(54) SYSTEM AND METHOD OF CONTROLLING A DRIVE AXLE SYSTEM

(71) Applicant: ArvinMeritor Technology, LLC, Troy, MI (US)

(72) Inventors: Todd R. Ekonen, Howell, MI (US); Dale Kwasniewski, Galesburg, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 15/405,421

(22) Filed: Jan. 13, 2017

(65) Prior Publication Data

US 2017/0129334 A1    May 11, 2017

Related U.S. Application Data

(63) Continuation of application No. 14/269,288, filed on May 5, 2014, now Pat. No. 9,579,975.

(51) Int. Cl.

| *B60K 17/35* | (2006.01) |
|---|---|
| *B60K 17/36* | (2006.01) |
| *B60K 17/346* | (2006.01) |
| *B60K 23/08* | (2006.01) |

(52) U.S. Cl.
CPC .......... *B60K 17/35* (2013.01); *B60K 17/3462* (2013.01); *B60K 17/36* (2013.01); *B60K 23/0808* (2013.01); *B60Y 2200/14* (2013.01); *B60Y 2300/429* (2013.01); *B60Y 2400/4244* (2013.01)

(58) Field of Classification Search
CPC .... B60K 17/35; B60K 17/3462; B60K 17/36; B60K 23/0808; B60Y 2200/14; B60Y 2300/429
See application file for complete search history.

(56) References Cited

U.S. PATENT DOCUMENTS

| 4,779,699 | A | 10/1988 | Hatano | |
|---|---|---|---|---|
| 5,456,641 | A | 10/1995 | Sawase | |
| 7,445,106 | B2* | 11/2008 | Capito | B60K 23/0808 192/103 F |
| 8,534,409 | B2* | 9/2013 | Sigmund | B60K 23/0808 180/247 |
| 8,651,994 | B2 | 2/2014 | Bassi et al. | |
| 9,746,064 | B2* | 8/2017 | Shoemaker | F16H 48/36 |
| 2003/0186772 | A1 | 10/2003 | Grogg et al. | |
| 2004/0035622 | A1 | 2/2004 | Ito et al. | |
| 2005/0161266 | A1 | 7/2005 | Hurlburt | |
| 2006/0105883 | A1* | 5/2006 | Krisher | B60K 17/344 477/175 |

(Continued)

FOREIGN PATENT DOCUMENTS

| DE | 102010034224 A1 | 2/2012 |
|---|---|---|
| EP | 1104714 A2 | 6/2011 |

OTHER PUBLICATIONS

European Patent Office, European Search Report for corresponding European Patent Application No. EP 15 16 2122 dated Sep. 7, 2015.

*Primary Examiner* — Anne Marie M Boehler
*Assistant Examiner* — Marlon A Arce
(74) *Attorney, Agent, or Firm* — Brooks Kushman P.C.

(57) ABSTRACT

A drive axle system and a method of control. The drive axle system may include a first drive axle assembly and a second drive axle assembly that may be operatively coupled via a slip clutch.

20 Claims, 4 Drawing Sheets

(56) References Cited

U.S. PATENT DOCUMENTS

| | | |
|---|---|---|
| 2006/0219146 A1* | 10/2006 | Gibbs .................. B60F 3/0007 |
| | | 114/144 R |
| 2006/0272866 A1 | 12/2006 | Ziech |
| 2008/0277182 A1 | 11/2008 | Heindl |
| 2010/0161190 A1 | 6/2010 | McCann et al. |
| 2010/0248888 A1 | 9/2010 | Hamperl et al. |
| 2011/0048822 A1 | 3/2011 | Kaltenbach et al. |
| 2011/0218715 A1* | 9/2011 | Duraiswamy .......... B60K 17/36 |
| | | 701/51 |
| 2014/0190758 A1 | 7/2014 | Osborn et al. |

* cited by examiner

SYSTEM AND METHOD OF CONTROLLING A DRIVE AXLE SYSTEM

CROSS-REFERENCE TO RELATED APPLICATIONS

This application is a continuation of U.S. application Ser. No. 14/269,288, filed May 5, 2014, now U.S. Pat. No. 9,579,975, the disclosure of which is hereby incorporated in its entirety by reference herein.

TECHNICAL FIELD

This patent application relates to a system and method of controlling a drive axle system.

BACKGROUND

A drive axle assembly with an interaxle differential unit is disclosed in U.S. Pat. No. 8,651,994.

SUMMARY

In at least one embodiment, a drive axle system may be provided. The drive axle system may include a first drive axle assembly and a second drive axle assembly. The second drive axle assembly may be coupled to the first drive axle assembly via a prop shaft that may be operatively coupled to a slip clutch.

In at least one embodiment, a method of controlling a drive axle system may be provided. The method may include detecting wheel slip of a wheel assembly that may be provided with a second drive axle assembly that receives torque from a first drive axle assembly via a prop shaft and a slip clutch. Torque provided from the first drive axle assembly to the second drive axle assembly may be reduced by allowing the slip clutch to slip when wheel slip is detected.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
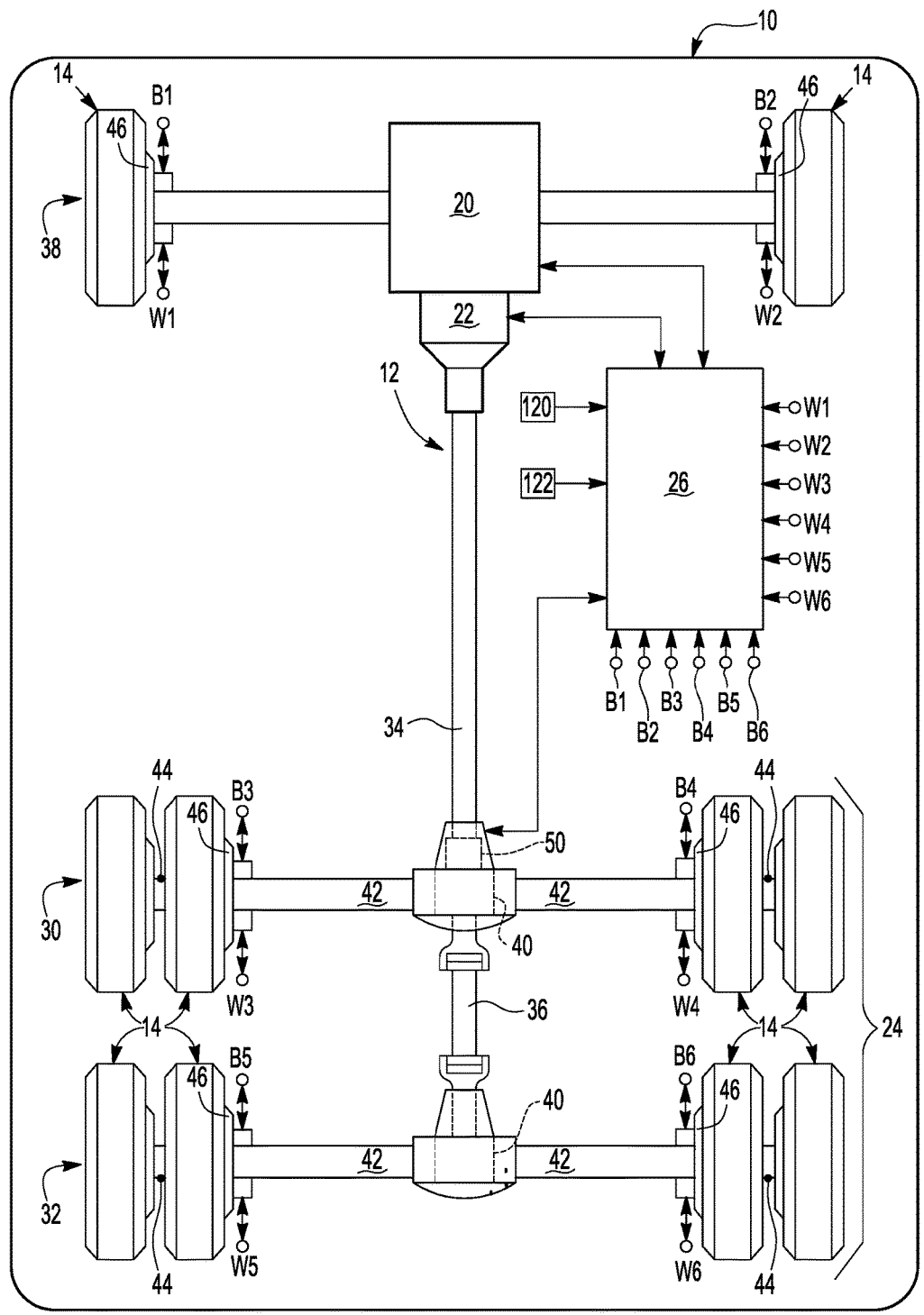
FIG. 1 is a schematic of an exemplary vehicle having a drive axle system.

Referring to FIG. 1, an exemplary vehicle 10 is shown. The vehicle 10 may be a motor vehicle like a truck, farm equipment, military transport or weaponry vehicle, or cargo loading equipment for land, air, or marine vessels. The vehicle 10 may include a trailer for transporting cargo in one or more embodiments.

The vehicle 10 may have a drivetrain 12 that may provide torque to one or more wheel assemblies 14 to propel the vehicle 10. The drivetrain 12 may have a hybrid configuration that may employ multiple power sources or a non-hybrid configuration. In a non-hybrid configuration, the drivetrain 12 may include an engine 20, a transmission 22, and a drive axle system 24. A controller 26 may also be provided to monitor and/or control vehicle components such as the drivetrain 12.

The engine 20 may provide power that may be used to rotate one or more wheel assemblies 14. For example, the vehicle 10 may have a set of wheel assemblies 14 that may include a tire mounted on a wheel. In at least one embodiment, the engine 20 may be configured as an internal combustion engine that may be adapted to combust any suitable type of fuel, such as gasoline, diesel fuel, or hydrogen.

The transmission 22 may be coupled to and may be driven by the engine 20. The transmission 22 may be of any suitable type, such as a multi-gear "step ratio" transmission as is known by those skilled in the art.

The drive axle system 24 may include a plurality of drive axle assemblies. Each drive axle assembly may rotatably support and may provide torque to one or more wheel assemblies 14. In FIG. 1, a first drive axle assembly 30 and a second drive axle assembly 32 are shown in a tandem axle configuration, although it is contemplated that a greater number of drive axle assemblies may be provided. In a tandem configuration, the first drive axle assembly 30 may be connected in series with the second drive axle assembly 32. The first drive axle assembly 30 may be referred to as a forward-rear drive axle assembly. The second drive axle assembly 32 may be referred to as a rear-rear drive axle assembly. An output of the transmission 22 may be coupled to an input of the first drive axle assembly 30 with a drive shaft 34. An output of the first drive axle assembly 30 may be coupled to an input of the second drive axle assembly 32 via a prop shaft 36.

The vehicle 10 may also include a front axle assembly 38 that may be configured to steer the vehicle 10. The front axle assembly 38 may or may not be configured as a drive axle that provides torque to at least one associated wheel assembly 14.

The first drive axle assembly 30 and the second drive axle assembly 32 may each have a differential 40. The differential 40 may receive torque from the engine 20 and transmission 22 and may transmit torque to a wheel assembly 14 via an associated axle 42. Each axle 42 may interconnect the differential 40 to at least one associated wheel hub assembly 44. In FIG. 1, two axles 42 are provided with the first drive axle assembly 30 and the second drive axle assembly 32 that extend from opposite sides of a corresponding differential 40. Each axle 42 may be coupled to an output of the differential 40 at a first end and may be coupled to a corresponding wheel hub assembly 44 at a second end. The wheel hub assembly 44 may facilitate coupling of a wheel assembly 14 to an axle 42. For example, a wheel assembly 14 may be mounted on and may rotate with the wheel hub assembly 44 and a corresponding axle 42.

A friction brake 46 may be disposed proximate each wheel hub assembly 44. The friction brake 46, which may also be called a foundation brake, may be configured to slow or inhibit rotation of at least one associated wheel assembly 14. Each friction brake 46 may include at least one brake pad assembly and a brake friction member. A brake pad assembly may have a friction material or brake lining that may engage the brake friction member during vehicle braking and may be spaced apart from the brake friction member when the friction brake 46 is not being applied. More specifically, a brake pad assembly may engage the brake friction member when braking is requested or commanded such that the frictional force exerted by the brake pad assembly against the brake friction member retards or slows rotation of its associated wheel assembly 14. The brake pad assembly may be spaced apart from the brake friction member when braking is not requested or applied. As such, the brake friction member may rotate with a wheel assembly 14 and with respect to a brake pad assembly when braking is not requested.

The friction brake 46 may have any suitable configuration. For example, a friction brake 46 may be configured as a drum brake or a disc brake. In a disc brake configuration, the brake friction member may be configured as a rotor and first and second brake pad assemblies may be configured to engage opposite sides of the rotor to slow the rotation of a wheel assembly 14. In a drum brake configuration, the brake friction member may be a brake drum that may extend completely around first and second brake pad assemblies that may be configured to engage the brake drum to slow rotation of a wheel assembly 14.

The drive axle system 24 may also include a slip clutch 50. The slip clutch 50 may permit or inhibit the transmission of torque from the first drive axle assembly 30 to the differential 40 of the second drive axle assembly 32.

The slip clutch 50 may be disposed in various locations between the input of the first drive axle assembly 30 and the differential 40 of the second drive axle assembly 32.

In FIG. 1, the slip clutch 50 may be disposed inside the first drive axle assembly 30 between an input of the first drive axle assembly 30 and the prop shaft 36. Such a configuration may allow the slip clutch 50 to be provided inside the housing of the first drive axle assembly 30 without providing an additional housing or mounting components that may be employed to mount the slip clutch 50 outside the housing.

Figure 2:
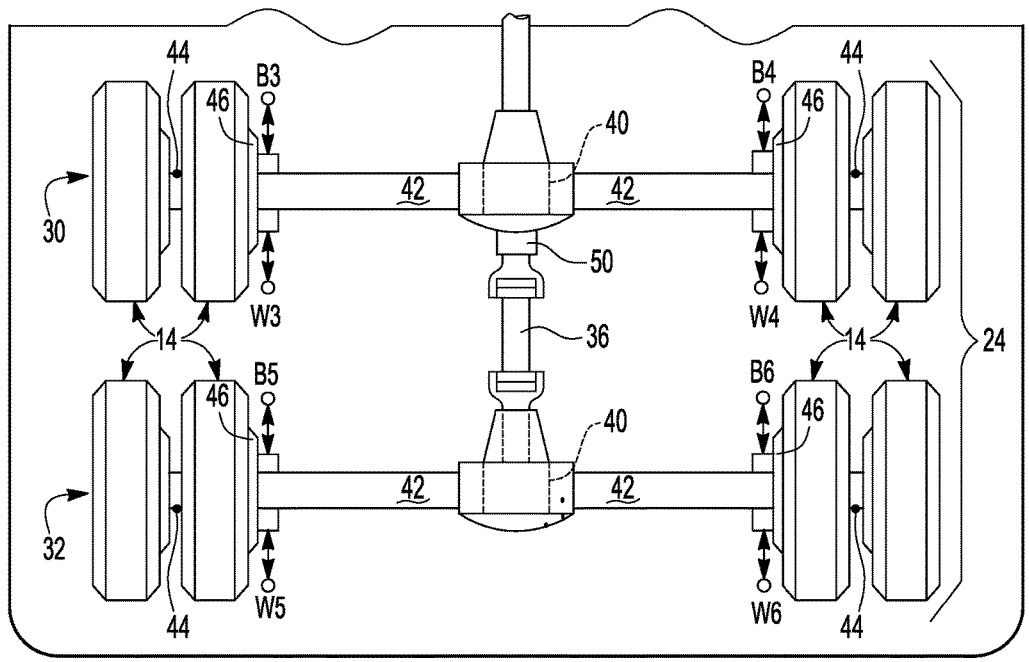
FIGS. 2-4 are schematics of additional drive axle system configurations.

In FIG. 2, the slip clutch 50 may be mounted to the outside of the housing of the first drive axle assembly 30 between the first drive axle assembly 30 and the prop shaft 36. In such a configuration, the slip clutch 50 may have a slip clutch housing that may be mounted to the housing of the first drive axle assembly 30. Such a configuration may improve accessibility for maintenance as the first drive axle assembly 30 may not be partially disassembled to access the slip clutch 50. In addition, such a configuration may allow an existing first drive axle assembly housing to be utilized without modifying its general size and shape.

Figure 3:
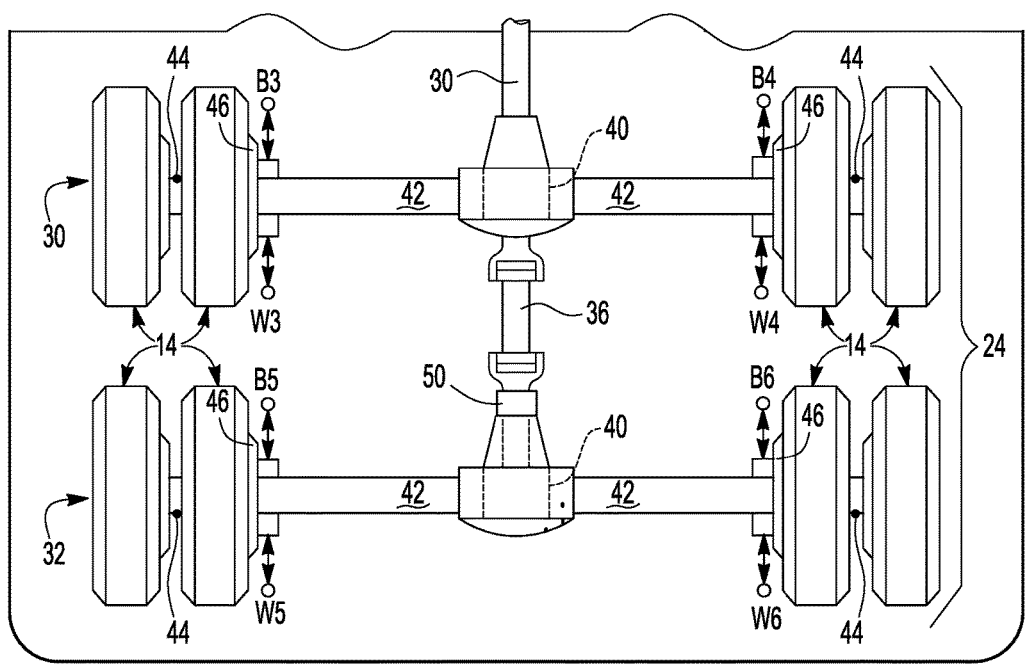

In FIG. 3, the slip clutch 50 may be mounted to the outside of the housing of the second drive axle assembly 32 between the prop shaft 36 and an input of the second drive axle assembly 32. In such a configuration, the slip clutch 50 may have a slip clutch housing that may be mounted to the housing of the second drive axle assembly 32. Such a configuration may improve accessibility for maintenance as the second drive axle assembly 32 may not be partially disassembled to access the slip clutch 50. In addition, such a configuration may allow an existing second drive axle housing to be utilized without modifying its general size and shape.

Figure 4:
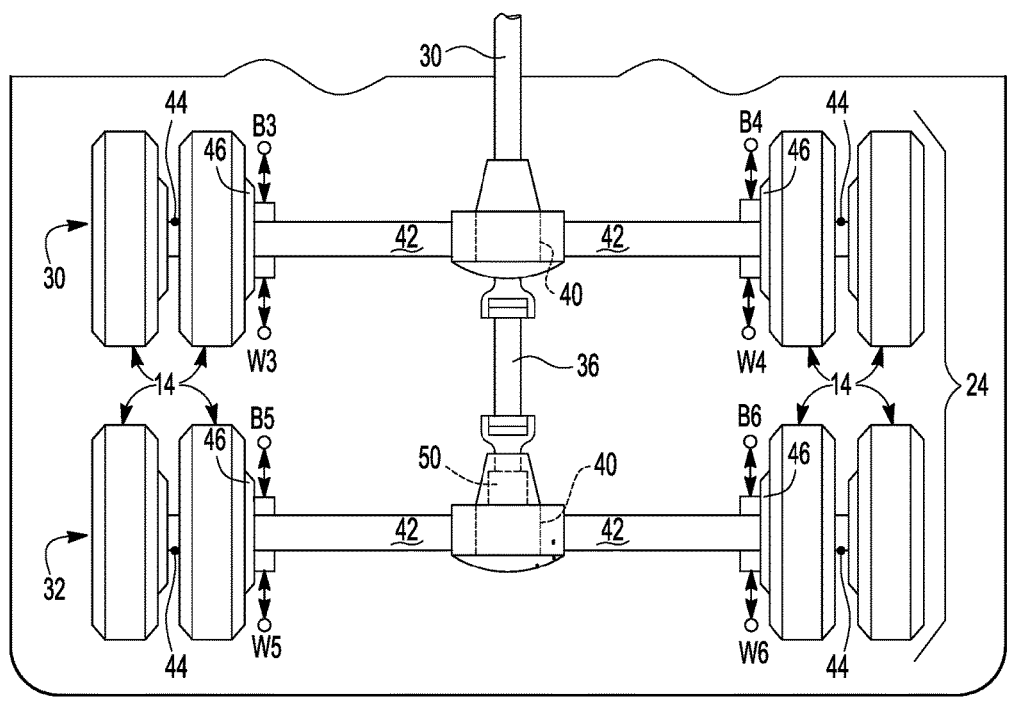

In FIG. 4, the slip clutch 50 may be disposed inside the second drive axle assembly 32 between the prop shaft 36 and the differential 40 of the second drive axle assembly 32. Such a configuration may allow the slip clutch 50 to be provided inside the housing of the second drive axle assembly 32 without providing an additional housing or mounting components that may be employed to mount the slip clutch 50 to the housing of the second drive axle assembly 32.

The slip clutch 50 may be configured to transmit torque between a clutch input and a clutch output when the slip clutch 50 is fully engaged (i.e., engaged and does not slip) or partially engaged (i.e., engaged but slips). As such, the slip clutch 50 may not be configured as a non-slip clutch, such as a dog clutch, in which torque is transmitted only when the clutch is fully engaged via interference engagement of teeth or when clutch teeth are meshed to transmit torque. More specifically, a non-slip clutch may have a binary operating mode in which torque is either transmitted when the non-slip clutch is fully engaged or no torque is transmitted when the non-slip clutch or clutch teeth are disengaged. Thus, a non-slip clutch is not configured to slip and cannot be controlled to adjust the amount of torque that is transferred from the clutch input to the clutch output by controlling slippage of the clutch (i.e., a slip clutch may transmit torque to an output when the clutch slips, but may transmit less torque to an output that is received at an input).

The slip clutch 50 may replace an interaxle differential unit, such as is described in U.S. Pat. No. 8,651,994. As such, the slip clutch 50 may replace mechanical interfaces that use gears that have teeth. The slip clutch 50 may not include gears that have teeth that mesh to enable torque transmission in disengaged to inhibit torque transmission. Moreover, the slip clutch 50 may not include shift forks, such as those that may slide in an axial direction along the shaft. Elimination of an interaxle differential unit may allow for a reduction of components of the first drive axle assembly 30 and may allow smaller components to be used in the second drive axle assembly 32.

The slip clutch 50 may be of any suitable type. For example, the slip clutch 50 may be a friction clutch and may be configured as a wet clutch or a dry clutch. In a wet clutch, components such as clutch plates or clutch discs may be at least partially immersed in a fluid that may lubricate and or cool the clutch components. In a dry clutch, such components may not be immersed in such a fluid.

Figure 5:
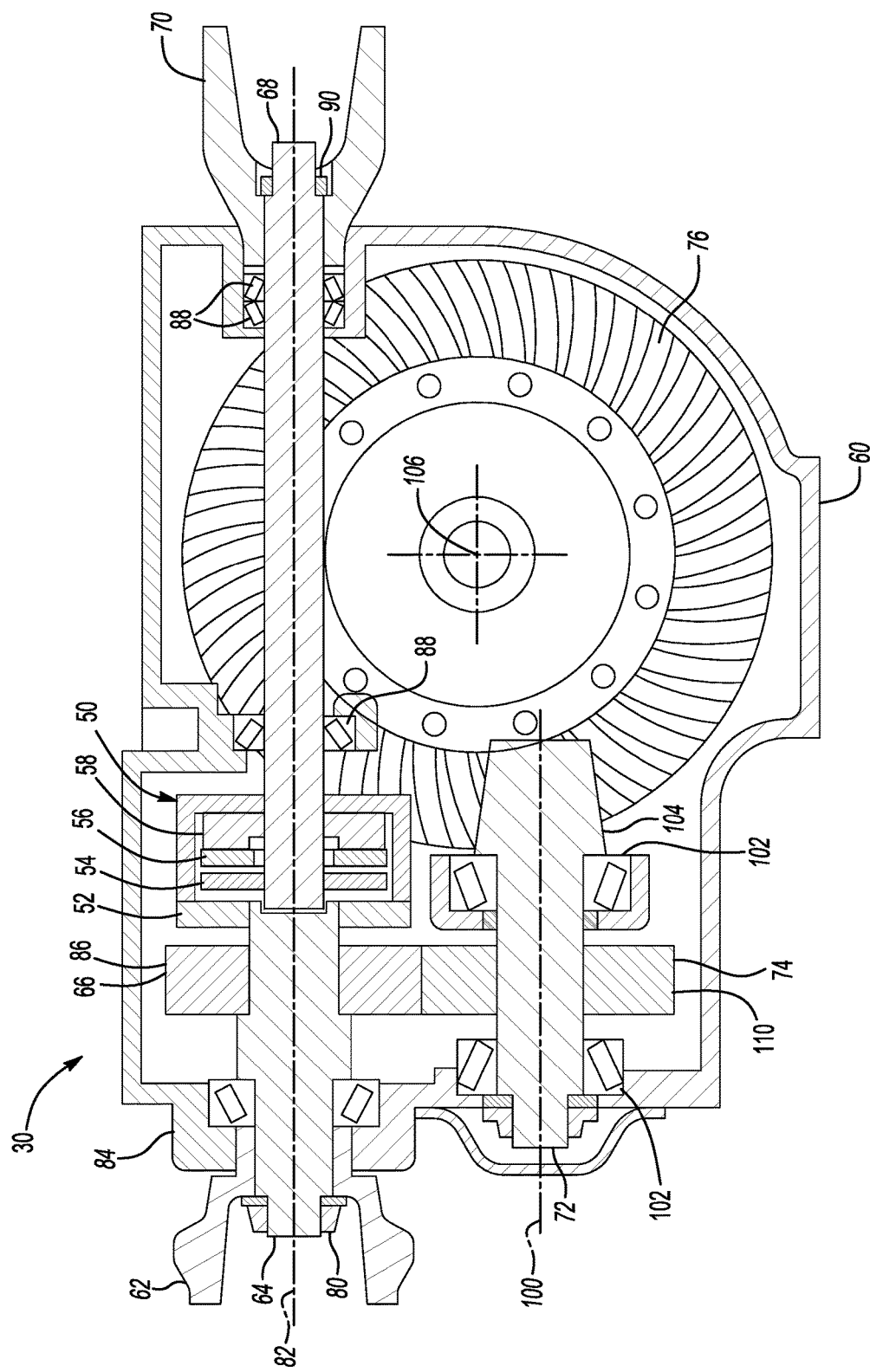
FIG. 5 is a cross section of a first drive axle assembly of the drive axle system of FIG. 1.

Referring to FIG. 5, a simplified example of a version of a slip clutch 50 is shown. The slip clutch 50 may have a flywheel 52, one or more clutch plates 54, a pressure plate 56, and an actuator 58. For simplicity, a single clutch plate 54 is shown. The flywheel 52 may be mounted on an input shaft that may provide torque. The clutch plate 54, which may also be called a clutch disc, may be disposed between the flywheel 52 and the pressure plate 56. The flywheel 52 and clutch plate 54 may have generally planar surfaces that face each other and that are free of gear teeth, although other configurations such as conical surfaces may be employed. The pressure plate 56 may be disposed between the clutch plate 54 and the actuator 58 and may be configured to engage and exert force on the clutch plate 54 to actuate the clutch plate 54 into engagement with the flywheel 52. The actuator 58 may provide force to actuate the pressure plate 56. The force provided by the actuator 58 may fully engage the clutch plate 54 and the flywheel 52 such that the clutch plate 54 does not slip and rotates at the same speed as the flywheel 52 or may engage the clutch plate 54 to the flywheel 52 such that the clutch plate 54 slips with respect to the flywheel 52. As such, the clutch plate 54 may receive torque from and may be rotated by the flywheel 52, but may rotate at a slower speed than the flywheel 52 during slip engagement. The amount of torque transmitted may be increased or decreased by decreasing or increasing the slip, respectively. Torque may not be transmitted from the flywheel 52 and the clutch plate 54 when the flywheel 52 is disengaged from the clutch plate 54.

The actuator 58 may be of any suitable type. For instance, the actuator 58 may be a fluid-based actuator like a pneumatic actuator or hydraulic actuator. A fluid-based actuator may employ a positive displacement pump that may provide a pressurized fluid that may be used to actuate the clutch plate or clutch disc. For example, pressurized fluid may actuate a piston that may in turn exert force on the clutch plate 54 to inhibit or permit slip and transmit a desired amount of torque. The actuator 58 may also be a non-fluid based actuator, such as an electromagnetic actuator, electromechanical actuator, or an electrical actuator like a motor.

Referring to FIG. 5, a portion of a first drive axle assembly 30 is shown in more detail. The first drive axle assembly 30 may be configured to provide torque to its associated wheel assemblies 14 via its axles 42 and/or to selectively provide torque to the second drive axle assembly 32 via the slip clutch 50. In at least one embodiment, the first drive axle assembly 30 may include a housing 60, an input yoke 62, an input shaft 64, a first gear 66, an output shaft 68, an output yoke 70, a pinion 72, a second gear 74, and a ring gear 76.

The housing 60 may receive various components of the first drive axle assembly 30. In addition, the housing 60 may facilitate mounting of the first drive axle assembly 30 to the vehicle 10.

The input yoke 62 may facilitate coupling of the first drive axle assembly 30 to the drive shaft 34. The input yoke 62 may be coupled to the drive shaft 34 in any suitable manner, such as with a universal joint. The input yoke 62 may also be fixedly coupled to the input shaft 64. For instance, the input yoke 62 may include a center bore that may receive an end portion of the input shaft 64. The center bore and the input shaft 64 may be provided with mating splines that may help align and secure the input yoke 62 to the input shaft 64. A fastener 80, such as a nut, may be threaded onto an end of the input shaft 64 to further secure and inhibit removal of the input yoke 62 from the input shaft 64.

The input shaft 64 may be configured to rotate about a first axis 82. For instance, the input shaft 64 may be supported by one or more bearings 84 that may be disposed in the housing 60. The bearings 84 may cooperate to facilitate rotation of the input shaft 64 while inhibiting axial movement of the input shaft 64 along the first axis 82. The input shaft 64 may be located above the pinion 72. The input shaft 64 may include a spline may mate with a corresponding spline on the input yoke 62. The input shaft 64 may be coupled to the slip clutch 50. For instance, the flywheel 52 of the slip clutch 50 may be coupled to and may rotate with the input shaft 64.

The first gear 66, which may also be called a drive gear, may be fixedly disposed on the input shaft 64. As such, the first gear 66 may rotate with the input shaft 64. The first gear 66 may include a plurality of teeth 86 that may be arranged around an outside circumference of the first gear 66.

The output shaft 68 may extend along and may be configured to rotate about the first axis 82. For instance, the output shaft 68 may be supported by one or more bearings 88 that may be disposed on the housing 60. The bearings 88 may facilitate rotation of the output shaft 68 while inhibiting axial movement of the output shaft 68 along the first axis 82. The output shaft 68 may be coupled to the slip clutch 50. For instance, the clutch plate 54 may be coupled to and may rotate with the output shaft 68.

The output yoke 70 may facilitate coupling of the first drive axle assembly 30 to the prop shaft 36. The output yoke 70 may be coupled to the prop shaft 36 in any suitable manner, such as with a universal joint. The output yoke 70 may be fixedly coupled to the output shaft 68. For instance, the output yoke 70 may include a center bore that may receive an end of the output shaft 68. The center bore and the output shaft 68 may be provided with mating splines that may help align and secure the output yoke 70 to the output shaft 68. A fastener 90, such as a nut, may be threaded onto an end of the output shaft 68 to further secure and inhibit removal of the output yoke 70 from the output shaft 68.

The pinion 72 may be spaced apart from the input shaft 64 and may be configured to rotate about a second axis 100. For instance, the pinion 72 may be supported by one or more bearings 102 that may be disposed in the housing 60. The bearings 102 may facilitate rotation of the pinion 72 while inhibiting axial movement of the pinion 72 along the second axis 100. In at least one embodiment, the first axis 82 and the second axis 100 may be spaced apart and extend substantially parallel to each other. A pinion gear 104 may be disposed at an end of the pinion 72. The pinion gear 104 may be integrally formed with the pinion 72 and may include a set of teeth that mate with corresponding teeth on one or more ring gears 76.

The ring gear 76 may be configured to rotate about a third axis 106 and may be coupled to an axle 42 of the first drive axle assembly 30. The pinion 72 and/or second axis 100 may be positioned below the third axis 106. Moreover, the slip clutch 50, input shaft 64, the first gear 66, the output shaft 68 and other components disposed along the first axis 82 may be positioned above the pinion 72 and the second axis 100 and the third axis 106 in one or more embodiments. This "high entry" configuration may position these components above lubricant that may accumulate in the bottom of the housing 60, thereby reducing or avoiding frictional drag with the lubricant that may otherwise reduce operational efficiency of the first drive axle assembly 30.

The second gear 74 may be disposed proximate the pinion 72. The second gear 74 may include a plurality of teeth 110 that may be generally arranged about an outside circumference of the second gear 74 that mate with the set of teeth 86 of the first gear 66.

Referring again to FIG. 1, one or more control modules or controllers 26 may be provided to monitor and control various components and systems of the vehicle 10. For simplicity, a single controller is shown in FIG. 1; however, it is contemplated that multiple control modules or controllers or a distributed control architecture may be provided with the vehicle 10. For example, the controller 26 may be a microprocessor-based controller that may be electrically connected to or communicate with components of the drivetrain 12, such as the engine 20 and transmission 22, to monitor and control their operation and performance.

The controller 26 may also monitor and control the friction brakes 46. For instance, the controller 26 may monitor and control the amount of brake torque provided by the friction brakes 46. As such, the controller 26 may cooperate with the friction brake 46 to provide antilock braking or antilock brake system (ABS) functionality. Communication between the controller 26 and each friction brake 46 or sensors associated with a friction brake 46 is represented by connection nodes B1 through B6 in FIG. 1.

The controller 26 may also monitor and control the slip clutch 50. For example, the controller 26 may control the force exerted by the actuator 58 to control engagement of the clutch plate 54 to the flywheel 52. As such, the controller 26 may fully engage the slip clutch 50, engage the slip clutch 50 such that the slip clutch 50 is permitted to slip yet transmit torque, vary the amount of slippage of the slip clutch 50, or disengage the slip clutch 50 to inhibit torque transmission to the second drive axle assembly 32.

In addition, the controller 26 may also process input signals or data from various input devices or sensors. Input devices that may be provided with the vehicle 10 may include a wheel speed sensor 120, and a vehicle speed sensor 122.

The wheel speed sensor 120 may be provided to detect or provide data indicative of a rotational speed of a wheel assembly 14. The wheel speed sensor 120 may be of any suitable type and may be configured to detect the rotation speed of a wheel assembly 14 or associated axle 42. Data from the wheel speed sensor 120 may also be used to determine a distance of travel of the vehicle 10. For instance, distance of travel may be based on tire size (e.g., tire diameter) and the rotational distance or number of revolutions detected by the wheel speed sensor 120. In at least one embodiment, a wheel speed sensor 120 may be associated with each wheel assembly 14 or axle 42. As such, the wheel speed sensor 120 may detect wheel slip or unexpected rotation of a wheel assembly 14 in a manner known by those skilled in the art. Communication between the controller 26 and each wheel speed sensor 120 is represented by connection nodes W1 through W6 in FIG. 1.

A vehicle speed sensor 122 may also be provided to detect or provide data indicative of a speed of the vehicle 10. The vehicle speed sensor 122 may be separate from the wheel speed sensor 120 and may be provided with a drivetrain component, such as the transmission 22 or transaxle, drive shaft 34, or an axle assembly shaft to detect vehicle speed based on the rotation speed of a drivetrain component. The vehicle speed sensor 122 may also be a virtual sensor. For example, the vehicle speed sensor 122 may employ data that may be wirelessly transmitted to the vehicle 10, such as data that may be provided to a navigation system or provided by a global positioning system (GPS) or the like to calculate the speed of the vehicle 10.

The controller 26 may control operation of the slip clutch 50 in various ways. For instance, the controller 26 may disengage the slip clutch 50 at high vehicle speeds or speeds above a first threshold vehicle speed value to cease providing propulsion torque to the second drive axle assembly 32 to reduce parasitic losses and improve fuel economy. The controller may fully engage the slip clutch 50 at low vehicle speeds or speeds below a second vehicle threshold speed value to provide torque to the second drive axle assembly 32 to help propel the vehicle 10. Such attributes may also account for or may be based on other vehicle attributes, such as vehicle weight, throttle command, and steering angle. For instance, higher vehicle weights and throttle commands may be indicative of situations in which more torque (less clutch slip) may be desired to be provided to the second drive axle assembly 32 to help propel the vehicle 10. In addition, the slip clutch 50 may allow torque to be transferred to the second drive axle assembly 32 whether or not the vehicle is stationary or moving at a low speed. For instance, the slip clutch 50 may help provide torque to components of the second drive axle assembly 32 that may be stationary or moving a lower rotational speeds than the first drive axle assembly 30. As such, the slip clutch 50 may be engaged in a controlled manner to provide smooth torque transfer to the second drive axle assembly 32 as compared to mechanical gears that may not be able to mesh unless rotation speeds are synchronized or the vehicle is traveling at a very low speed.

The controller 26 may automatically vary the amount of torque provided via the slip clutch 50 when a wheel slip condition is detected. For instance, the controller 26 may reduce the amount of torque that is provided to the second drive axle assembly 32 when wheel slip of a wheel of the second drive axle assembly 32 is detected. Wheel slip may be indicative of relative motion between a tire and the road surface or surface under the vehicle 10 upon which the tire is moving. Wheel slip may be expressed as a wheel slip ratio that may be representative of a ratio of the rotational speed of a braked wheel to that of an equivalent free rolling wheel. Wheel slip ratio may be expressed as a percentage and may be calculated using the following formula.

Wheel slip ratio %=(Vehicle speed−wheel speed)/Vehicle speed×100

Wheel speed may be based on data from a wheel speed sensor 120. Vehicle speed may be based on data from the vehicle speed sensor 122.

Wheel slip or the wheel slip ratio may be compared to a slip reference value to determine whether the amount of wheel slip is expected or acceptable. The slip reference value may be a predetermined constant or static value that may be expressed as a percentage of the wheel slip ratio, such as 15% to 20%. A wheel slip condition may exist when the wheel slip ratio exceeds the slip reference value. If a wheel slip condition is detected, then the controller 26 may reduce the amount of torque that is provided to the second drive axle assembly 32 by reducing the force exerted by the actuator 58 and allowing the slip clutch 50 to slip. The desired actuation force may be calculated or based on data in a lookup table that may be established based on vehicle development testing.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A drive axle system comprising:
   a first drive axle assembly having a housing, an output shaft, a first differential, and a pair of axles that interconnect the first differential to a first pair of wheel hub assemblies;
   a second drive axle assembly having a second differential, a second pair of axles that interconnect the second differential to a second pair of wheel hub assemblies, and a sensor;
   a prop shaft that extends between the first drive axle assembly and the second drive axle assembly;
   a slip clutch that is operatively connected to the prop shaft, wherein the second differential receives torque from the first drive axle assembly via the prop shaft and the slip clutch; and
   an electronic controller that controls operation of the slip clutch to reduce torque that is provided from the first drive axle assembly to the second drive axle assembly by allowing the slip clutch to slip based on a signal from the sensor, wherein the slip clutch receives torque from the output shaft and provides torque to the prop shaft when the slip clutch is at least partially engaged.

2. The drive axle system of claim 1 wherein the sensor detects wheel slip of a wheel assembly that is provided with the second drive axle assembly.

3. The drive axle system of claim 2 wherein the sensor is a wheel speed sensor and the signal is indicative of wheel slip of the wheel assembly.

4. The drive axle system of claim 1 wherein the sensor is a vehicle speed sensor, the signal is indicative of vehicle speed, and the electronic controller fully disengages the slip clutch when the vehicle speed exceeds a first threshold vehicle speed value.

5. The drive axle system of claim 4 wherein the electronic controller fully engages the slip clutch when the vehicle speed is less than a second threshold vehicle speed value that is less than the first threshold vehicle speed value.

6. The drive axle system of claim 1 wherein the slip clutch is a friction clutch.

7. The drive axle system of claim 1 wherein the slip clutch is a wet clutch.

8. The drive axle system of claim 1 wherein the slip clutch is disposed in the housing of the first drive axle assembly.

9. The drive axle system of claim 1 wherein the output shaft and the prop shaft are rotatable at a same speed when the slip clutch is fully engaged.

10. The drive axle system of claim 1 wherein an input shaft of the first drive axle assembly and the output shaft are rotatable at a same speed when the slip clutch is fully engaged.

11. The drive axle system of claim 1 wherein the first drive axle assembly and the second drive axle assembly do not include an interaxle differential unit.

12. The drive axle system of claim 1 wherein the slip clutch is disposed between the housing of the first drive axle assembly and the prop shaft.

13. The drive axle system of claim 1 wherein the slip clutch is disposed outside the housing of the first drive axle assembly.

14. A drive axle system comprising:
 a first drive axle assembly having a first differential and a pair of axles that interconnect the first differential to a first pair of wheel hub assemblies;
 a second drive axle assembly having a second differential, a second pair of axles that interconnect the second differential to a second pair of wheel hub assemblies, a housing, an input shaft, and a sensor;
 a prop shaft that extends between the first drive axle assembly and the second drive axle assembly;
 a slip clutch that is operatively connected to the prop shaft, wherein the second differential receives torque from the first drive axle assembly via the prop shaft and the slip clutch; and
 an electronic controller that controls operation of the slip clutch to reduce torque that is provided from the first drive axle assembly to the second drive axle assembly by allowing the slip clutch to slip based on a signal from the sensor, wherein the slip clutch receives torque from the prop shaft and provides torque to the input shaft of the second drive axle assembly when the slip clutch is at least partially engaged.

15. The drive axle system of claim 14 wherein the slip clutch is disposed between the prop shaft and the housing of the second drive axle assembly.

16. The drive axle system of claim 14 wherein the slip clutch is disposed outside the housing of the second drive axle assembly.

17. The drive axle system of claim 14 wherein the slip clutch is disposed in the housing.

18. The drive axle system of claim 14 wherein the sensor provides a signal indicative of wheel slip of a wheel assembly of the second drive axle assembly.

19. The drive axle system of claim 14 wherein the first drive axle assembly and the second drive axle assembly do not include an interaxle differential unit.

20. The drive axle system of claim 14 wherein the electronic controller fully disengages the slip clutch when a vehicle speed exceeds a first threshold vehicle speed value and fully engages the slip clutch when the vehicle speed is less than a second threshold vehicle speed value that is less than the first threshold vehicle speed value.

* * * * *